United States Patent
Raike et al.

(10) Patent No.: US 7,076,067 B2
(45) Date of Patent: Jul. 11, 2006

(54) ENCRYPTED MEDIA KEY MANAGEMENT

(75) Inventors: William Michael Raike, Auckland (NZ); Brian James Donovan-Smith, Auckland (NZ); Sean Joseph Higgins, Auckland (NZ); Patrick John Martin, Auckland (NZ)

(73) Assignee: RPK New Zealand Limited, Auckland (NZ)

( * ) Notice: Subject to any disclaimer, the term of this patent is extended or adjusted under 35 U.S.C. 154(b) by 752 days.

(21) Appl. No.: 09/901,473

(22) Filed: Jul. 10, 2001

(65) Prior Publication Data

US 2002/0162104 A1  Oct. 31, 2002

Related U.S. Application Data

(60) Provisional application No. 60/269,845, filed on Feb. 21, 2001.

(51) Int. Cl.
*H04L 9/00* (2006.01)
(52) U.S. Cl. .................. 380/277; 713/165; 713/167
(58) Field of Classification Search ............... 380/277; 705/51, 59
See application file for complete search history.

(56) References Cited

U.S. PATENT DOCUMENTS

| | | | | | |
|---|---|---|---|---|---|
| 5,862,220 | A | * | 1/1999 | Perlman | 713/162 |
| 6,073,124 | A | * | 6/2000 | Krishnan et al. | 705/59 |
| 6,636,966 | B1 | * | 10/2003 | Lee et al. | 713/165 |
| 6,775,655 | B1 | * | 8/2004 | Peinado et al. | 705/59 |
| 2001/0016836 | A1 | * | 8/2001 | Boccon-Gibod et al. | 705/51 |

FOREIGN PATENT DOCUMENTS

JP        11266483 A   *  9/1999

* cited by examiner

*Primary Examiner*—Gilberto Barron
*Assistant Examiner*—Kristin M. Derwich
(74) *Attorney, Agent, or Firm*—Goodwin Procter, LLP

(57) ABSTRACT

A key or licence management system for the secure online distribution of digitized audio-visual works ("media") using encryption techniques. Encrypted media is stored on a media server while the encryption keys are stored on a media key server. Users acquire rights from online retailers to obtain from the media key server keys corresponding to the media they wish to play. The key server encrypts keys before releasing them, preferably with the user's public key using a public key encryption algorithm. Keys are stored in volatile memory at the user's client device and thus the user is in receipt of the key just in time to play the media.

5 Claims, 1 Drawing Sheet

ENCRYPTED MEDIA KEY MANAGEMENT

Transmitted herewith for filing is the patent application claiming priority from and the benefit of U.S. Provisional Application Ser. No. 60/269,845, filing date Feb. 21, 2001.

FIELD OF INVENTION

This invention relates to the secure distribution of digitised audio-visual works using an encryption key management system.

PRIOR ART

Audio-visual entertainment works are conventionally distributed direct to the consumer by audio or video CDS or by broadcasting or cablecasting. Subject to adequate bandwidth the Internet provides a viable alternative for the distribution of digitised audio-visual works. Among other things digital distribution via the internet provides a solution to the problems which have hitherto hindered the development of video on demand services.

Technology for digitising and playing digitised audio and video works is well known. Where the digitised works are distributed electronically through a data network such as the Internet the size of the files (even when compressed) and the bandwidth of the network mean that streaming techniques must be used if the consumer is to be able to commence listening or viewing within a reasonable period of requesting the work to be downloaded. An example of streaming software is Real Networks Inc's RealServer and RealPlayer.

One of the problems with making available digitised audio-visual works on the Internet is that pirated copies may easily be made and distributed thereby depriving producers and copyright owners of income. There is a need to ensure that audio-visual works can be played only by consumers who have paid for them.

To control unauthorised use of Internet-distributed audio and video works encryption systems have been proposed, but the management of the keys required for decryption to date is inconvenient, inefficient or inadequate.

SUMMARY OF INVENTION

It is therefore an object of the present invention to provide a method for the secure distribution of digitised audio-visual works over a data network.

Accordingly in one aspect the invention consists in a method for the secure distribution of digitised audio-visual works ("media") to consumers over a data network comprising the steps of:

encrypting said media using a different encryption key for each work ("media key"), storing the encrypted media on one or more first servers, storing the media keys on a second server, making available one or more retail servers from which consumers may obtain the right to receive media keys for desired media in exchange for complying with conditions set by the retailer, the consumer causing a request to be made from a network-connected client device to a selected retail server for at least the media key for a desired media work, at the selected retail server, verifying the consumer has complied with the retailer's conditions, and if so, the retail server either passing said request to the second server, or supplying to the client device data allowing the second server to be contacted, at said second server verifying the allowability of fulfilling requests from said retail server or a client device and if so allowable encrypting the relevant media key and downloading it to either said retail server or said client device, said retail server if receiving an encrypted media key from said second server, downloading said encrypted media key to said client device, at the client device decrypting the received media key and storing it in memory in either encrypted or decrypted form, subsequently, at the client device generating a request to the appropriate first server to supply the desired media work, from the first server downloading the desired encrypted media work to said client device, and at the client device retrieving the media key from said memory and using it to decrypt the media work to a condition where it can be played using appropriate player software.

The inventive concept may also be applied to the secure distribution of other digitised products over the Internet. Accordingly in a further aspect the invention consists in a method for the secure distribution of digitised products to consumers over a data network comprising the steps of;

encrypting said products using a different encryption key for each product ("product key"), storing the encrypted product on a first server, storing the product keys on a second server, creating steering files corresponding to each product and its corresponding key, said steering files containing information identifying the media work and the respective locations of the product and product key, making available on a third server steering files corresponding to each product for consumers to purchase, said steering files when executed on a network-connected client computer device accessible to the consumer causing a request to be made to said second server for the key for the product identified in the steering file, at the second server encrypting the relevant product key with a key unique to the consumer and downloading it to said client device, decrypting the product key at said client device and storing it in memory in either encrypted or decrypted form, subsequently, generating a request to the first server from said client device to deliver the product identified in the steering file, downloading the encrypted product from said first server to said client device, retrieving the product key from said memory and using it to decrypt the product to to a condition where it is ready for use.

Preferably a public key encryption system is used to encrypt the media key for downloading to the client device and to facilitate this the client device uploads to the second server the consumer's public key.

DESCRIPTION OF THE PREFERRED EMBODIMENTS

Figure 1:
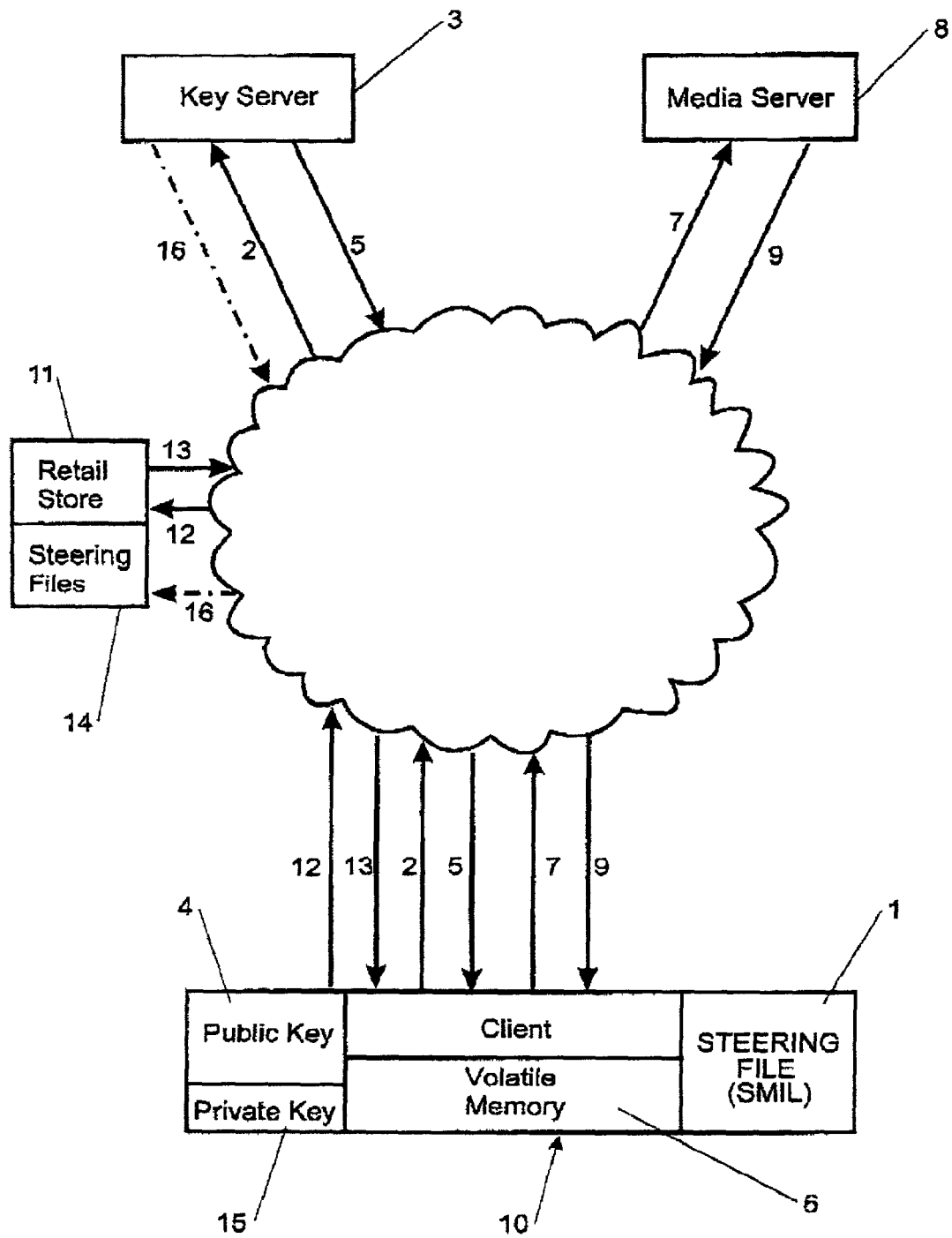
FIG. 1 shows a diagrammatic representation of a key management system for encrypted digitised audio-visual works.

The present invention in particular, but not solely concerns the secure online delivery of content such as audio-visual works in streaming media form. The content is encrypted and a key management or rights management system established to ensure only authorised users can decrypt and play the content. It is part of the invention that the encrypted content is made available separately from the encryption keys or access rights and these rights or keys are purchased or otherwised acquired by consumers from an entity who holds neither media or keys. Additionally security is maximised if all three functions are managed by separate entities from separate server sites.

The present invention delivers media keys to consumers or end-users who wish to have access to encrypted media through the use of client devices consisting of either general purpose computers (eg "PCS") or special-purpose computing devices (eg "set-top boxes") equipped with decryption processing capability. The enctypted media may consist of streams or of files. In his case wherein it is intended to be able to deliver the media to more than one recipient, whether simultaneously (multicast) or separately on a per-recipient basis (unicast), or else by a file download mechanism, an encrypting entity will perform the encryption using a media key generated for this purpose, and it is this media key that is to be delivered only to authorised end users. In the event that a public-key algoritlun is used to encrypt the media, the term "media key" in this context is intended to mean the private key or decryption key required to decrypt the media.

In the systems described here, the media key is delivered to end users by an agent or entity termed a "key server". Following encryption of the actual media by the encrypting entity, the media key is transmitted or delivered securely to the key server. The encrypting entity also transmits or delivers the encrypted media, using any ordinary means, to a "media servers" whose role is to deliver the media to end users either by multicast or unicast streaming or by a file download mechanism. More than one media server may be employed by the content provider. To best secure the media it is important for the key server and media server to be managed by separate entities.

An example of currently available means by which media streams may be delivered from a media server to an end user is the RealServer and RealPlayer software produced by Real Networks Inc.

Referring to FIG. 1 in one embodiment of the proposed system for delivering media keys "just in time" for their use, an end user will obtain from a retailer 11 (i.e. an Internet "store" or "shop") by making a request 12, a "steering file" 1 for the media work selected by the user which is downloaded 13 to the user. This file contains information needed by the user's software running on client device 10 to make two requests: one for the appropriate media keys and the other for the user selected encrypted media. The latter function may be ormitted in some business models with the user obtaining encrypted media independently of and at a different time to obtaining the media key. The retail store 11 will have previously downloaded or updated 16 a database 14 containing sufficient media information to allow it to construct steering files for a content provider's media repertoire. These will be sold to end users using a variety of conventional online or partly online payment techniques.

An example of a suitable steering file format is a SMIL file, commonly used by RealPlayer to organise and synchronise multiple requests for media on remote servers. An example of a SMIL file for this purpose is:

<smil><body><par><seq>
<ref src="file://C:\EncryptMedia\MediaKey\clinton.mpeg.rk"/>
<ref src="file://C:\EncryptMedia\Encrypted\clinton.mpeg.em"/>
</seq></par></body></smil>

The steering file may alternatively be implemented by a Media Delivery Metafile (MDM) of which the following is an example:

```
<?xml version="1.0" ?>
<MDM Version="1">
  <MediaInfo>
<MEDIAURL>rtsp://localhost/rpkencrypted/ac5e538e.rm</MEDIAURL>
    <NAME>Greatest Hits - Shining Like A National Guitar/Still crazy
    after all these years/Rock</NAME>
    <DESCRIPTION>0</DESCRIPTION>
    <AUTHOR>Paul Simon</AUTHOR>
    <COPYRIGHT></COPYRIGHT>
  </MediaInfo>
  <KEYSERVER>
    <KEYURL>rtsp://localhost/SecureKey/ac5e538e.rk</KEYURL>
    <KSPLK>RPK34KHAB22Sz6YOCV4LxM9kLvLNj7HFaCSwO8XBuKql
YUUm25Vt5w5HNYOfZKqvabQ29
Ei1PuTingVEMEHZEbq-EMImU2_Pk7sNcXTdHhlYQA</KSPLK>
  </KEYSERVER>
</MDM>
```

The SMIL file first causes the user's software (eg RealPlayer) on the client device 10 to send an appropriate request 2 to a key server 3 for the media key corresponding to the media to which the SMIL file relates, The information needed to make this request includes the location of the key server 3 and information that allows the key server to determine which media key is being requested. The process by which this request is made will also include means by which the end user transmits its own public key 4 to the key server 3, and may include transmitting additional identifying or authentication information to the key server. It is preferred that the media key be encrypted using a public key algorithm and it is to facilitate this that the user's public key 4 is provided to the key server.

If the key server 3 verifies, by means external to the present system, that the end user is entitled to receive the requested media key, then the key server 3 encrypts the media key under the end user's public key and sends it 5 to the end user. The end user's software (eg a decrypting "plugin" for RealPlayer) will store the encrypted media key, preferably in volatile memory 6, or alternatively may immediately decrypt the media key with the end user's private key 15 and store the clear media key in volatile memory. The media key is intended to reside in volatile memory (eg RAM) to make it more secure than if it was stored on a hard drive and to prevent unauthorised repeat use if a pay per view business model is being applied.

Upon receipt of the encrypted media key, the steering file 1 then causes the user's software to request 7 a media server 8 to deliver the encrypted media. The media is downloaded 9 and when it arrives (the first encrypted packet in the case of streaming delivery, or the entire encrypted file in the case of download delivery), the media key is retrieved from volatile memory 6, asymmetrically decrypted as already described if it has been stored in encrypted form, and then used to decrypt the media so that it can be viewed or played or otherwise used.

In the embodiment just described the retail store 11 constructs, in response to user requests, steering files containing steering information, which may include entitlement information (eg unique electronic "tickets"), obtained in advance from the key server manager, However in another embodiment the retail store may not maintain a stock of such steering information and may instead obtain the information directly from the key server 3 each time it receives a request 2 from a user. The key server 3 could deliver the steering information to the retail store 11 for download to the user or alternatively download the steering information directly to the user client device 10. Verification procedures would still be carried out by the retail store 11 and the key server 3 to verify payment and entitlement respectively.

In a third embodiment efficiency gains could be achieved by modifying the second embodiment so that the user would receive a file containing steering information for the media server 8 but instead of steering information for the key server 3, would actually receive in this file an encrypted key. This could be downloaded direct by the key server 3 or via the retail store 11 for forwarding to the user. In such a scenario the steering file information would simply contain the location of the media server and an identifier for the encrypted media selected by the user. As in the first embodiment the user's software cannot play the encrypted media unless it also is in possession of the key associated with that media to allow it to be decrypted.

The advantages of the system described are:
(a) only authorised recipients have access to media keys;
(b) the business and functional responsibilities of managing keys are separated from the responsibilities for managing encrypted media;
(c) the media keys are delivered to end users "just in time" for them to be used to decrypt the media;
(d) media keys are not transmitted or stored anywhere other than at a trusted key server unless they have been encrypted under an authorised user's public key;
(e) the steps required for use of the system by an end user is very simple so that no special knowledge or skill regarding security or encryption techniques is required for end users to use the system.

We claim:

1. A method for the secure distribution of digitised audio-visual works to consumers over a data network comprising the steps of:
   encrypting said digitised audio-visual works using a different encryption key for each work,
   storing the encrypted digitised audio-visual works on one or more first servers,
   storing the encryption keys on a second server,
   making available one or more retail servers from which consumers may obtain the right to receive the encryption keys for desired media in exchange for complying with conditions set by the retailer,
   creating steering files corresponding to each digitised audio-visual works and its corresponding encryption key, said steering files containing information identifying the digitised audio-visual work and the location of the encryption key and the location of the corresponding digitised audio-visual work,
   making available said steering files on said one or more retail servers,
   the consumer causing a request to be made from a network-connected client device to a selected retail server for at least the encryption key for a desired digitised audio-visual work,
   said steering files when processed on said client device causing a request to be made to said second server for the key for the digitised audio-visual work identified in the steering file and causing the client device to generate said request to the first server identified in said steering file to supply the encrypted digitised audio-visual work,
   at the selected retail server, verifying the consumer has complied with the retailer's conditions, and if so,
   the retail server either passing said request to the second server, or supplying to the client device data allowing the second server to be contacted,
   at said second server verifying the allowability of fulfilling requests from said retail server or a client device and if so allowable encrypting the relevant encryption key and downloading it to either said retail server or said client device,
   said retail server if receiving an encrypted encryption key from said second server, downloading said encrypted encryption key to said client device,
   at the client device decrypting the received encryption key and storing it in memory in either encrypted or decrypted form,
   subsequently, at the client device generating a request to the appropriate first server to supply the desired digitised audio-visual work,
   from the first server downloading the desired encrypted digitised audio-visual work downloading the encrypted digitised audio-visual work to said client device, and
   at the client device retrieving the encryption key from said memory and using it to decrypt the digitised audio-visual work to a condition where it can be played using appropriate player software.

2. A method according to claim 1 wherein at the client device the encrypted key is stored in memory in encrypted form and when the encrypted digitised audio-visual work is downloaded to said client device the encrypted key is retrieved from memory, decrypted and used to decrypt the digitised audio-visual work.

3. A method according to either of claims 1 or 2 wherein said second server encrypts encryption keys for consumers using a public key encryption algorithm and when said client device generates a request to either said retail server or said second server for a encryption key it includes in the request the consumer's public key, said second server encrypting the relevant encryption key with the consumer's public key and upon receipt of said encrypted encryption key said client device decrypting the key using to consumer's private key.

4. A method as claimed in either of claims 1 or 2 wherein the client device stores the encryption key in volatile memory.

5. A method according to either of claims 1 or 2 wherein said retail server passes received client device requests to said second server and said second server upon verifying the allowability of fulfilling requests from said retail server downloading the encrypted encryption key to said retail server.

* * * * *